(No Model.)

E. S. MARSHALL.
SIDE BEARING.

No. 587,132. Patented July 27, 1897.

Witnesses:
G. A. Pennington
J. R. Cornwall

Inventor:
Edward S. Marshall,
by Paul Bakewell
his Atty.

UNITED STATES PATENT OFFICE.

EDWARD S. MARSHALL, OF ST. LOUIS, MISSOURI, ASSIGNOR TO THE MISSOURI RAILWAY EQUIPMENT COMPANY, OF EAST ST. LOUIS, ILLINOIS.

SIDE BEARING.

SPECIFICATION forming part of Letters Patent No. 587,132, dated July 27, 1897.

Application filed March 22, 1897. Serial No. 628,567. (No model.)

*To all whom it may concern:*

Be it known that I, EDWARD S. MARSHALL, a citizen of the United States, residing at the city of St. Louis, State of Missouri, have invented a certain new and useful Improvement in Side Bearings, of which the following is a full, clear, and exact description, reference being had to the accompanying drawings, forming a part of this specification, in which—

Figure 1:
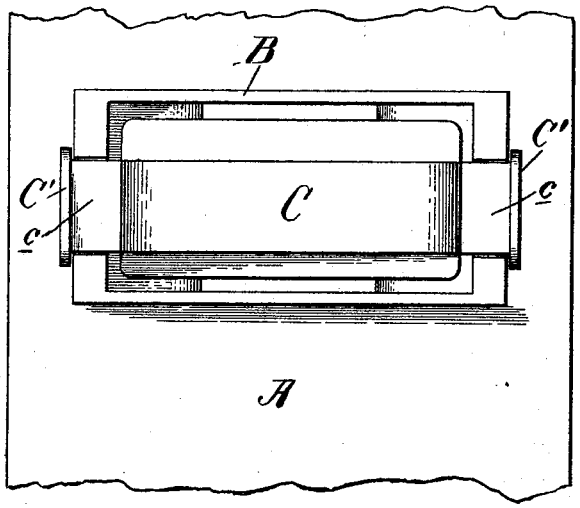
Figure 3:
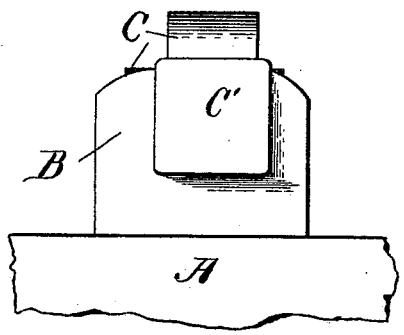
Figure 2:
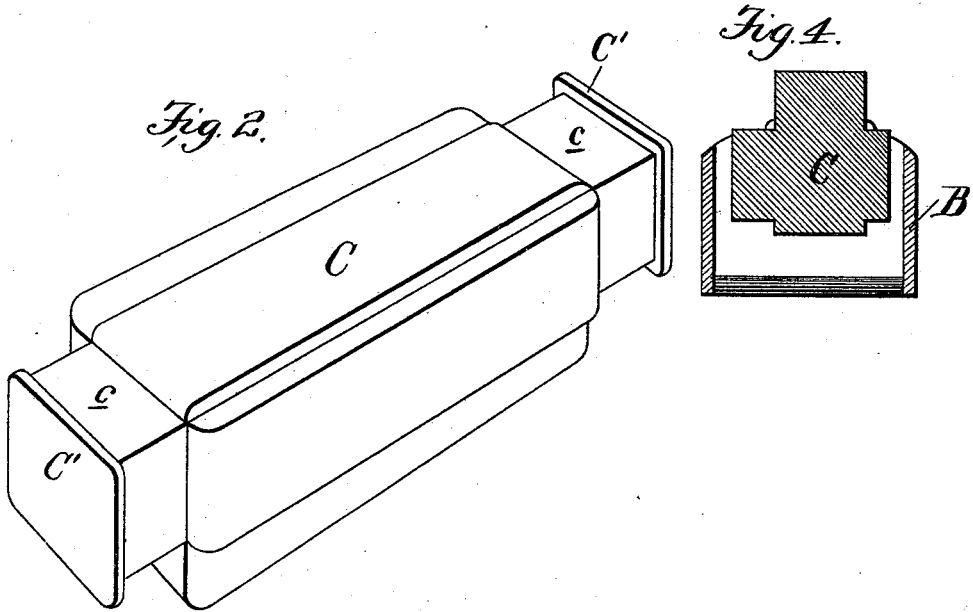
Figure 4:
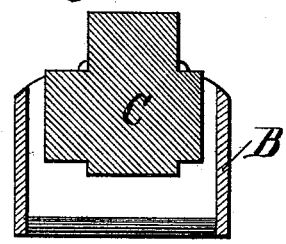

Figure 1 is a top plan view of my improved side bearing. Fig. 2 is a detailed view of the revolubly-adjustable bearing-block. Fig. 3 is an end view of the side bearing, and Fig. 4 is a cross-sectional view.

This invention relates to a new and useful improvement in side bearings for railway-cars, and is especially designed for use as a truck-bearing for freight-cars.

The object of the invention is to provide a bearing of the character described with means whereby the height of side bearings may be adjusted relative to the load carried by the car-body, in order that the body-bearings will not rest hard upon the side bearings when the car is loaded.

It is well known that in loading cars the load ought to be carried by the center plates, the side bearings not touching, so that the trucks can accommodate themselves to the curves. When the body of the car sags down on each side, causing the bearings of the truck and car-body to contact with each other, the truck in rounding curves is very apt to bind or be restricted in its movements, which will cause sharp flanges on the wheels and sometimes derailment. It is the practice at the present time to shim up the center bearing, thus causing delay. The car-body should be free of the truck side bearings, in order to permit the free movement of the truck. Bearings as at present constructed are of such character that when the car-body is loaded and rests upon the truck side bearings some of the load has to be removed or chances be taken of sharp flanges on the wheels or of the wheels keeping the track in rounding curves. Even where roller side bearings are employed the friction is so great as to prevent the free movement of the truck.

My invention therefore consists in the construction of a side bearing which is capable of being adjusted relative to the car-body in such manner that when a car is loaded should said car rest upon the truck side bearing the body of the car can be elevated by using an ordinary journal-jack and the bearing manipulated so as to be lower in height than it formerly was, whereby when the car-body is in its normal position "daylight" can be seen between the side bearings. Of course it will be understood that the bearings on each side of the truck are adjusted correspondingly.

In the drawings, A indicates the bolster or that part of the car-truck which supports the side bearings. B indicates the side-bearing pocket, formed on or secured to the bolster A or other suitable support. This pocket is open at its upper side, and in its ends are formed notches or recesses, preferably rectangular in shape.

C indicates the bearing-block, which is preferably rectangular in cross-section.

*c* indicates rectangular studs projecting from the ends of the bearing-block, which studs are adapted to be seated in the recesses or notches in the end walls of the pocket. These studs are eccentrically arranged relative to the axle-line of the block, so that the faces of the block are at varying distances from the nearest face of the studs.

C' indicates heads on the outer ends of the stud-supports to add strength to the structure.

In first introducing a bearing-block into the pocket it is so arranged that it presents its highest face to the car-body. It is well known that all cars when empty are less liable to sag than loaded ones. When the car is loaded, however, the body-transom will sag at its ends and the truck-bolster deflect in the center, causing undue weight on the side bearings. Under such conditions the car can be raised on one side at a time and the block turned to present a new and lower face to the body-bearing, so that no undue weight shall be on the side bearings. This can be done by any trainman with the ordinary journal-jack. Should the car-body continue to settle or sag in future use, the adjustment of this side bearing can be made to compensate for these differences.

In the drawings I have shown the bearing-block as having four faces, and therefore four adjustments can be made. The studs which fit in the recesses in the end walls of the pocket are made with a corresponding number of faces, and the form I have illustrated is best adapted for ordinary use. However, I am aware that additional faces may be added, if desired, or the block could be so arranged that but two or three adjustments could be made. Therefore I do not wish to be limited to the exact details of construction shown in the accompanying drawings, but desire to be understood as claiming, broadly, the combination with suitable supports for the bearing-block (it is obvious that a pocket is not necessary in this connection) and a bearing-block arranged in said supports in such manner that it will be held in its proper position against rotation, but whose bearing-faces may be changed to different heights to accommodate different loads carried by the car.

Having thus described my invention, what I claim is—

1. The combination with a truck-bolster, of rotatable bearing-blocks having flat bearing-faces at different distances from their axial line, said bearing-blocks being arranged in suitable supports mounted on said bolster, and means for holding said blocks in fixed positions relative to their supports, substantially as described.

2. The combination with a truck-bolster, of suitable supports arranged thereon, rotatable bearing-blocks mounted in said supports, said blocks having flat bearing-faces on different sides and at different distances from their axial line, and angular studs projecting from the ends of the bearing-blocks for coöperating with angular recesses in the supports for holding said blocks in adjusted positions, substantially as described.

3. The combination with suitable supports, formed with rectangular recesses or notches in their upper edges, of a bearing-block, formed with flat bearing-faces, rectangular studs projecting from the ends of said bearing-block and adapted to fit in the recesses in said supports; substantially as described.

4. The combination with suitable supports, formed with rectangular recesses or notches in their upper edges, of a bearing-block, formed with flat bearing-faces, rectangular studs projecting from the ends of said bearing-block and adapted to fit in the recesses in said supports, said studs being eccentrically disposed to the longitudinal axis of said block; substantially as described.

5. The combination with a side-bearing pocket having rectangular recesses formed in the upper edges of its end walls, of a bearing-block formed with bearing-faces on different sides, studs projecting from the ends of said bearing-block, said studs being rectangular in cross-section and fitting in the end walls of the pocket, and heads on the outer ends of said studs; substantially as described.

In testimony whereof I hereunto affix my signature, in presence of two witnesses, this 6th day of March, 1897.

EDWARD S. MARSHALL.

Witnesses:
F. R. CORNWALL,
HUGH K. WAGNER.